United States Patent [19]
Sandstrom

[11] 4,110,293
[45] Aug. 29, 1978

[54] PROCESS FOR STABILIZING LATEX AND STABLE LATICES PRODUCED THEREBY

[75] Inventor: Paul H. Sandstrom, Tallmadge, Ohio

[73] Assignee: The Goodyear Tire & Rubber Company, Akron, Ohio

[21] Appl. No.: 790,113

[22] Filed: Apr. 22, 1977

[51] Int. Cl.² .............................................. C08L 9/04
[52] U.S. Cl. ................. 260/29.7 R; 252/356; 260/23 EM; 260/23.7 A; 260/29.7 EM; 260/29.7 P; 526/213
[58] Field of Search ....... 260/23 EM, 23.7 A, 29.7 R, 260/29.7 EM, 29.7 P; 526/213; 252/356

[56] References Cited

U.S. PATENT DOCUMENTS

| 2,465,888 | 3/1949 | Lawrence | 526/213 |
|---|---|---|---|
| 2,871,137 | 1/1959 | Aldridge et al. | 260/29.7 H |
| 2,912,399 | 11/1959 | Barte | 260/29.6 H |
| 3,258,437 | 6/1966 | Peters et al. | 260/29.7 N |
| 3,544,502 | 12/1970 | Boyer et al. | 260/29.6 R |
| 4,017,560 | 4/1977 | Tazuma et al. | 260/27 BB |

Primary Examiner—Eugene C. Rzucidlo
Attorney, Agent, or Firm—D. B. Little

[57] ABSTRACT

Latex is stabilized by the addition of small amounts of salts of maleic anhydride/alpha-methylstyrene adduct and maleic anhydride/alpha-methylstyrene dimer adduct. The adduct salt is incorporated into the emulsifier solution used in the emulsion polymerization system.

9 Claims, No Drawings

PROCESS FOR STABILIZING LATEX AND STABLE LATICES PRODUCED THEREBY

BACKGROUND OF THE INVENTION

Stabilizers or secondary emulsifiers are well known in the latex art. They are added to the emulsifier or soap solution used in the emulsion polymerization in order to reduce the formation of coagulum or gum. Other variables such as choice of agitation conditions can influence latex stability as well by affecting particle size and distribution.

Various types of stabilizers have been used. Protective colloids, exemplified by methacrylates, gelatin, pectinates, and caseinates, are frequently used in combination with emulsifiers to effect micelle concentration or to prevent premature coagulation by forming a thin film at the interface between the polymer droplets and the water.

Secondary emulsifiers, generally used at concentrations between 0.04 and 1 weight percent based on total monomer being 100 weight percent, are divided into three groups. Anionic soaps are exemplified by alkali salts of palmitic acid, stearic acid and oleic acid. Nonionic soaps, for example, reaction products of long-chain alcohols with ethylene oxide, are resistant to cold temperatures and changes in pH. They are expensive, make coagulation difficult, and require addition of other materials such as amines for pH control and to aid in coagulation. Cationic soaps are frequently used in the latex industry and are exemplified by dodecylammonium chloride and hexadecylpyrridinium chloride.

Electrolytes such as potassium chloride and sodium phosphate are also used in the soap solutions. The presence of an electrolyte lowers the latex viscosity and affects particle size. However, too much electrolyte can cream the latex or cause it to flocculate.

High molecular weight alcohols and polyhydroxy compounds can serve as stabilizers in certain cases.

One widely used dispersant stabilizer is the sodium salt of a condensed naphthalene sulfonic acid. It is readily soluble in water and is not appreciably affected by salts and acids although it is most effective at alkaline pH. Most latices are manufactured at a pH ranging from 9 to 12.

In using the sodium salt of a condensed naphthalene sulfonic acid in rubber latex manufacture, care must be taken in choosing the level at which it is used. The quantity should be sufficient to accomplish the desired goal of reducing prefloc or gum but not so great that it interferes with coagulation. In fact, it is such an effective dispersant that it causes problems in the treatment of waste water effluent from rubber manufacturing facilities.

Primary waste water treatment in these factories often consists of coagulation followed by sedimentation or flotation which processes serve to remove a substantial proportion of pollutants (suspended solids, chemical oxygen demand, COD, and biological oxygen demand, BOD). The sodium salt of a condensed naphthalene sulfonic acid is not affected by the rubber coagulation process and remains in the supernatant spent coagulant liquor which is rejected to the waste treatment process. Unfortunately, it is also unaffected by the coagulants used therein, and it resists biodegradation. It remains dissolved and continues through the rest of the waste treatment steps to the final discharge at least partially intact. It is a significant contributor to COD concentration, and a reduction in effluent COD is the constant goal of those working in the rubber industry.

The stabilizers of this invention, while doing an excellent job of dispersing the emulsified rubber droplets prior to the coagulation step, do not become part of the process effluent. Instead, they are precipitated in the rubber coagulation process with the rubber crumb.

Another stabilizer which stays with the rubber after coagulation is described by U.S. Pat. No. 3,544,502 (salts of polymethylated muconic acids). However, these are added after the polymerization reaction, not as part of the reaction emulsifier solution.

Copolymers and adducts containing maleic acid esters and maleic anhydride are disclosed in the following references: U.S. Pat. No. 2,912,399 (copolymers of maleic acid esters and styrene in an organic solvent as an ingredient in waterproof emulsions); U.S. Pat. No. 2,871,137 (salt of an adduct of maleic anhydride with SRR, NBR or another rubber as an emulsifying agent); Encyclopedia of Polymer Science and Technology, Vol. 5, p. 822, Interscience Publ., N.Y. 1966 (styrene-maleic anhydride copolymers as a protective colloid in emulsion polymerizations).

SUMMARY OF THE INVENTION

The objects of this invention are to provide: (1) a process for stabilizing latex in which the stabilizer is precipitated with the rubber crumb during the coagulation step, and (2) an emulsion composition for latex polymerizations which imparts high stability to the finished polymer emulsion. Other objects and advantages will hereinafter appear.

The above objects are accomplished by incorporating into the emulsifier or buffer solution (used in a latex polymerization) small amounts of a salt of maleic anhydride/alpha-methylstyrene adduct or a soap of maleic anhydride/alpha-methylstyrene dimer adduct. There is a myriad of buffer solutions used in the latex industry. As a minimum they contain water and a soap. Other common ingredients are surfactant, caustic, electrolyte and stabilizer or secondary emulsifier. Commonly used soaps are saturated fatty acid soaps, such as potassium stearate, and disproportionated wood rosin soaps.

Incorporation into the emulsifier solution is accomplished in the same way as is normally done in latex manufacture. The emulsifier solution is usually made by mixing all the ingredients (including stabilizer) together in an agitated tank in which the emulsifier solution is heated to the proper temperature, stored, and from which it is transferred to the reactor.

The stabilizers of this invention prevent the formation of coagulum in the latex, and during the coagulation step by any of the common techniques (e.g. salt acid or alum) they are precipitated out of solution along with the rubber crumb. They may be utilized in any emulsion polymerization system provided they are not substantially reactive with any member of the monomer system. For example they can be used in butadiene/styrene (SBR), acrylonitrile/butadiene (NBR), butadiene (polybutadiene) and piperylene (polypiperylenes) monomer systems.

The adduct salts of this invention may also be utilized in NBR polymerizations as the principal emulsifier at levels of approximately 2.5 parts by weight per 100 parts by weight of monomer, replacing the sodium salt of a condensed naphthalene sulfonic acid in this service. Their main advantage is a reduction in plant waste water COD.

For purposes of this invention, the term "adduct" does not mean a pure addition product but rather a mixture of oligomers of the two principal reactants, maleic anhydride and either alpha-methylstyrene or alpha-methylstyrene dimer. The reactions hereinafter described produce a mixture which is hydrolized and neutralized to the desired product.

Alpha-methylstyrene/maleic anhydride adduct can be synthesized by mixing the two chemicals in a ratio of 1 to 3 moles maleic anhydride per mole of alpha-methylstyrene at a temperature between 150° and 210° C. for 1 to 6 hours. The reaction mixture is then stripped of volatiles under a vacuum. The amber product is characterized by a softening point (ASTM Method E 28–67) between 100 and 180 and by an acid number between 520 and 750.

The principal component is believed to be

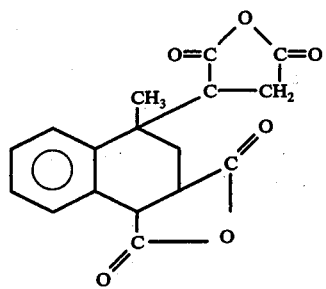

Alpha-methylstyrene dimer is a mixture of 2,4-diphenyl-4-methyl-1-pentene; 2,4-diphenyl-4-methyl-2-pentene; and 1,1,3-trimethylphenylindane. For purposes of the present invention it is preferred that the mixture has as its major component 2,4-diphenyl-4-methyl-1-pentene and that it contain only minor amounts of alpha-methylstyrene trimer. One process for producing alpha-methylstyrene dimer with a high selectivity for 2,4-diphenyl-4-methyl-1-pentene is described in Belgium Patent 821,943.

Alpha-methylstyrene dimer/maleic anhydride adduct can be synthesized by thermal reaction in a manner similar to that previously described for alpha-methylstyrene. The mole ratio of maleic anhydride to alpha-methylstyrene dimer should be between 2:1 and 3:1. Temperature of the reaction may be between 100° and 195° C. and reaction time may be from 1 to 6 hours. The product is stripped under a vacuum.

One of the principal components is believed to be:

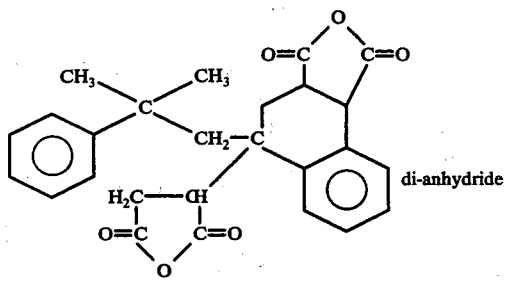

di-anhydride

Hydrolysis and neutralization are carried out by treating either adduct with water and an alkali metal hydroxide. Sufficient water is used to keep the adduct salt in solution. The pH of the final adduct salt solution generally varies from 9 to 12. Thus, the term salt as used herein means alkali metal salt.

A more detailed description of these adduct salts and their preparation can be found in a patent application by Mario D. Zadra and James J. Tazuma entitled "Soaps of Maleic Anhydride Adducts of Alpha-Methylstyrene and Alpha-Methylstyrene Dimer" filed the same day as this application.

PREFERRED EMBODIMENTS OF THE INVENTION

The salts of maleic anhydride/alpha-methylstyrene adduct and maleic anhydride/alpha-methylstyrene-dimer adduct will function within a pH range of 4 to 14 but they are most stable in the higher range of 9 to 12 (most common for synthetic rubber latex).

The emulsifier recipe for each different latex and rubber is unique. In some cases, such as SBR, the salts of this invention may be substituted for a sodium salts of a condensed naphthalene sulfonic acid on a weight for weight basis. In other instances, for example NBR, recipe adjustments are necessary. For any given product some experimentation is necessary to optimize the stabilizer level.

In SBR polymerizations, the adduct salts of this invention will have some stabilizing effect when utilized in amounts of from 0.025 to 1.0 parts by weight per 100 parts by weight of total monomer, but amounts of from 0.05 to 0.3 parts by weight per 100 parts by weight of total monomer are preferred.

The invention will be better understood from a consideration of the following examples given for the sake of illustration, but with no intention of limiting the scope of the invention. Except where otherwise stated, percentages are by weight and parts are parts by weight per 100 parts by weight of monomer charged.

A series of 5-gallon reactor batches was run at 10° C. using pure monomers according to the mixed soap redox recipe shown in Table I. Various amounts of the sodium salt of a condensed naphthalene sulfonic acid and the potassium salt of alpha-methylstyrene dimer/maleic anhydride adduct were included in the polymerization recipe to determine their effect on stability.

Table I

| Material | Parts |
| --- | --- |
| Water | 195.0 |
| Potassium fatty acid soap | 2.25 |
| Potassium rosin acid soap | 2.25 |
| Sodium salt of a condensed naphthalene sulfonic acid* or adduct salt | Variable |
| Tripotassium phosphate | Variable |
| Styrene | 20.5 |
| t-Mercaptan | 0.14 |
| Water | 5.0 |
| Ferrous sulfate heptahydrate | 0.004 |
| Iron chelating agent | 0.22 |
| Sodium formaldehyde sulfoxylate | 0.044 |
| 1,3-Butadiene | 75.0 |
| Styrene | 4.5 |
| Paramenthane hydroperoxide | 0.06 |

*Obtained as Tamol SN (a trademark of The Rohm and Haas Company)

The batches were polymerized to 65 percent conversion in approximately 10 hours. Mechanical stability of the latices (after steam stripping to remove residual monomers) was measured using ASTM Method D1417. Rotor speed was 14,000 rpm, and rotor disc diameter was 36.12 mm. Results appear in Table II.

TABLE II

| Sample | ML-4* | Tamol SN | Adduct Salt | Tripotassium Phosphate | pH | Solids % | Surface Tension dyne/cm | Coagulum % |
|---|---|---|---|---|---|---|---|---|
| | | | High Shear Latex Stability | | | | | |
| 1 | (130) | 0 | 0 | 0 | 9.5 | 19.1 | 62.3 | .40 |
| 2 | (132) | 0.15 | 0 | 0 | 9.8 | 21.9 | 65.9 | .30 |
| 3 | (134) | 0.3 | 0 | 0 | 9.8 | 16.2 | 63.3 | .17 |
| 4 | (128) | 0.6 | 0 | 0 | 10.1 | 16.4 | 63.8 | .13 |
| 5 | (118) | 0 | 0.05 | 0 | 10.5 | 19.7 | 52.2 | .14 |
| 6 | (102) | 0 | 0.1 | 0 | 10.5 | 19.4 | 59.2 | .21 |
| 7 | (132) | 0 | 0.15 | 0 | 10.5 | 21.4 | 58.2 | .12 |
| 8 | (106) | 0 | 0.3 | 0 | 10.5 | 24.2 | 63.4 | .20 |
| 9 | (94) | 0 | 0 | 0.4 | 10.5 | 19.4 | 59.2 | .49 |
| 10 | (97) | 0.15 | 0 | 0.4 | 10.5 | 23.2 | 64.8 | .08 |
| 11 | (114) | 0 | 0.15 | 0.2 | 10.5 | 20.1 | 57.5 | .08 |

*Mooney viscosity at 100° C., 4 minutes.

High shear stability data obtained on the batches containing increasing amounts of the potassium adduct salt show no general pattern but all indicate a much improved latex stability, comparable to that obtained with the sodium salt of a condensed naphthalene sulfonic acid. The data also indicate that the addition of 0.15 part of the potassium adduct salt to a recipe containing 0.2 part electrolyte (tripotassium phosphate) provides a sharp improvement in latex stability. Because of material cost, it is best to use the lowest effective level of stabilizer, which from the data appears to be in the range of 0.05 to 0.15 parts.

Bottle polymerization data indicate that the potassium hydroxide salt of alpha-methylstyrene dimer/maleic anhydride adduct can be used as a replacement for the sodium salt of a condensed naphthalene sulfonic acid in NBR polymerizations providing certain recipe adjustments are made. If the dimer adduct salt is used at a level of 2.5 parts, experiments have shown that satisfactory latex stability is obtained if the level of a secondary surfactant, a linear alkyl sulfonate, is increased from about 0.2 parts to between about 0.8 and 2.0 parts.

While certain representative embodiments and details have been shown for the purpose of illustrating the invention, it will be apparent to those skilled in this art that various changes and modifications may be made therein without departing from the spirit or scope of the invention.

What is claimed is:

1. In a process for synthesizing an emulsion polymer, the improvement which comprises incorporating from approximately 0.025 to 2.5 parts per 100 parts monomer of a salt selected from the group consisting of salts of alpha-methylstyrene/maleic anhydride adduct and salts of alpha-methylstyrene dimer/maleic anhydride adduct into the emulsifier solution.

2. The process as recited in claim 1 wherein the emulsion polymer is acrylonitrile-butadiene rubber and the adduct salt is utilized at a level of approximately 2.5 parts per 100 parts of monomer.

3. In a process for synthesizing emulsion styrene-butadiene rubber, the improvement which comprises incorporating a salt selected from the group consisting of salts of alpha-methylstyrene/maleic anhydride adduct and salts of alpha-methylstyrene dimer/maleic anhydride adduct into the emulsifier solution at a level of 0.025 to 1.0 parts per 100 parts of monomer.

4. The stable aqueous synthetic rubber latex synthesized by the process recited in claim 3.

5. The process as recited in claim 3 wherein the adduct salt is utilized at a level of from 0.05 to 0.3 parts per 100 parts of monomer.

6. The process as recited in claim 5 which further comprises incorporating an electrolyte into the emulsifier solution.

7. The process of claim 6 in which the electrolyte is tripotassium phosphate at a concentration of 0.2 to 0.6 parts per 100 parts of monomer.

8. An emulsifier solution for emulsion polymerization comprised of 195 parts water, 2.25 parts potassium fatty acid soap, 2.25 parts potassium rosin acid soap, and 0.025 to 1.0 parts of a salt selected from the group consisting of salts of alpha-methylstyrene/maleic anhydride adduct and salts of alpha-methylstyrene dimer/maleic anhydride adduct.

9. The emulsifier solution of claim 8 which is further comprised of 0.2 to 0.6 parts tripotassium phosphate.

* * * * *

UNITED STATES PATENT AND TRADEMARK OFFICE
CERTIFICATE OF CORRECTION

PATENT NO. : U.S. 4,110,293
DATED : August 29, 1978
INVENTOR(S) : Paul H. Sandstrom It is certified that error appears in the above-identified patent and that said Letters Patent are hereby corrected as shown below:

Column 2, Line 19, "SRR" should be --SBR--.

Signed and Sealed this

Twenty-fourth Day of July 1979

[SEAL]

Attest:

LUTRELLE F. PARKER
*Attesting Officer*  *Acting Commissioner of Patents and Trademarks*